(12) United States Patent
Doljack

(10) Patent No.: US 9,805,890 B2
(45) Date of Patent: Oct. 31, 2017

(54) ELECTRONIC DEVICE STATE DETECTION FOR ZERO POWER CHARGER CONTROL, SYSTEMS AND METHODS

(71) Applicant: COOPER TECHNOLOGIES COMPANY, Houston, TX (US)

(72) Inventor: Frank Anthony Doljack, Pleasanton, CA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 514 days.

(21) Appl. No.: 13/662,988

(22) Filed: Oct. 29, 2012

(65) Prior Publication Data

US 2013/0207455 A1    Aug. 15, 2013

Related U.S. Application Data

(60) Provisional application No. 61/556,577, filed on Nov. 7, 2011.

(51) Int. Cl.
*H01H 35/00* (2006.01)
*H02J 7/00* (2006.01)
*H02J 9/00* (2006.01)

(52) U.S. Cl.
CPC ........... *H01H 35/00* (2013.01); *H02J 7/0036* (2013.01); *H02J 9/005* (2013.01); *H02J 2007/0062* (2013.01); *H02J 2009/007* (2013.01); *Y10T 307/50* (2015.04); *Y10T 307/858* (2015.04)

(58) Field of Classification Search
CPC . Y02T 10/7005; Y02T 10/7077; B60R 16/03; B60R 16/0315; B60L 11/14
USPC ................. 307/9.1, 18, 29, 43, 130
See application file for complete search history.

(56) References Cited

U.S. PATENT DOCUMENTS

| 4,583,035 A | 4/1986 | Sloan |
| 5,260,637 A | 11/1993 | Pizzi |
| 5,602,460 A * | 2/1997 | Fernandez et al. ........... 320/152 |
| 6,081,101 A | 6/2000 | Yang |

(Continued)

FOREIGN PATENT DOCUMENTS

| CN | 1905344 A | 1/2007 |
| CN | 201323464 Y | 10/2009 |

(Continued)

OTHER PUBLICATIONS

International Search Report and Written Opinion of International Application No. PCT/US2012/063695; Jul. 15, 2013; 10 pages.

(Continued)

*Primary Examiner* — Thienvu Tran
*Assistant Examiner* — Brian K Baxter
(74) *Attorney, Agent, or Firm* — Armstrong Teasdale LLP

(57) ABSTRACT

A charger appliance configured to determine a no-load, disconnected state from an electronic device having a rechargeable battery, and configured to determine a connected state of the charger with an electronic device in which recharging power may be supplied through the charger to the electronic device. Automatic connection and disconnection of a mains power supply is made depending on the detected state of the charger to avoid wasteful energy consumption in a no-load state. State detection may be determined by monitoring a voltage on one or more signal lines associated with the electronic device.

30 Claims, 12 Drawing Sheets

(56) References Cited

U.S. PATENT DOCUMENTS

| | | | |
|---|---|---|---|
| 6,339,314 B1 | 1/2002 | Bruning | |
| 6,742,630 B2 | 6/2004 | Eilinger | |
| D522,463 S | 6/2006 | Novotney et al. | |
| 7,253,594 B2 | 8/2007 | Paul et al. | |
| 7,268,561 B2 | 9/2007 | Zhu | |
| 7,331,426 B2 | 2/2008 | Jahkonen | |
| D588,545 S | 3/2009 | Andre et al. | |
| D601,097 S | 9/2009 | Novotney et al. | |
| D604,253 S | 11/2009 | Andre et al. | |
| 7,646,620 B2 | 1/2010 | MacDonald et al. | |
| D611,415 S | 3/2010 | Andre et al. | |
| 7,692,411 B2 | 4/2010 | Trainor et al. | |
| 7,770,039 B2 | 8/2010 | DuBose | |
| 7,779,278 B2 | 8/2010 | DuBose | |
| 7,781,908 B2 | 8/2010 | DuBose et al. | |
| D623,136 S | 9/2010 | Andre et al. | |
| 7,795,759 B2 | 9/2010 | DuBose et al. | |
| 7,795,760 B2 | 9/2010 | DuBose et al. | |
| 7,800,252 B2 | 9/2010 | DuBose et al. | |
| 7,904,738 B2 | 3/2011 | DuBose | |
| 7,908,498 B2 | 3/2011 | DuBose | |
| 7,910,834 B2 | 3/2011 | McGinley et al. | |
| 7,960,648 B2 | 6/2011 | McGinley et al. | |
| 7,967,610 B2 | 6/2011 | Lynch et al. | |
| 7,977,823 B2 | 7/2011 | DuBose et al. | |
| 7,982,439 B2 | 7/2011 | Trainor et al. | |
| D653,213 S | 1/2012 | Andre et al. | |
| 8,174,380 B2 | 5/2012 | Travis et al. | |
| 2002/0169915 A1* | 11/2002 | Wu | 710/305 |
| 2005/0213749 A1* | 9/2005 | Sakurai et al. | 379/413 |
| 2005/0253458 A1* | 11/2005 | Omae et al. | 307/10.1 |
| 2006/0075152 A1 | 4/2006 | Zhu | |
| 2006/0181241 A1 | 8/2006 | Veselic | |
| 2009/0001938 A1 | 1/2009 | Vantu et al. | |
| 2009/0033293 A1* | 2/2009 | Xing et al. | 320/164 |
| 2009/0085368 A1* | 4/2009 | Coffelt et al. | 296/70 |
| 2009/0089605 A1* | 4/2009 | Westwick et al. | 713/340 |
| 2009/0128099 A1 | 5/2009 | Minkkinen | |
| 2009/0206792 A1* | 8/2009 | Hyatt | H02J 7/0032 320/114 |
| 2009/0295233 A1* | 12/2009 | McGinley | H02J 9/005 307/126 |
| 2010/0067158 A1* | 3/2010 | Saarinen | 361/91.1 |
| 2010/0264875 A1* | 10/2010 | Hoffman | H02J 3/14 320/111 |
| 2011/0001485 A1 | 1/2011 | Feight et al. | |
| 2011/0006603 A1* | 1/2011 | Robinson et al. | 307/31 |
| 2011/0043162 A1 | 2/2011 | Lee et al. | |
| 2011/0051476 A1 | 3/2011 | Manor et al. | |
| 2011/0068626 A1 | 3/2011 | Terlizzi et al. | |
| 2011/0074360 A1 | 3/2011 | Kerr et al. | |
| 2011/0101931 A1* | 5/2011 | Chen | 323/234 |
| 2011/0241627 A1* | 10/2011 | Arai et al. | 320/162 |
| 2011/0260555 A1* | 10/2011 | McGinley | H02J 9/005 307/116 |
| 2012/0003863 A1* | 1/2012 | Sung et al. | 439/489 |
| 2012/0071215 A1* | 3/2012 | Bourque | G06F 1/266 455/573 |
| 2012/0271468 A1* | 10/2012 | Doljack | H02J 9/005 700/286 |
| 2013/0064508 A1* | 3/2013 | Kelly | 385/56 |
| 2013/0093242 A1* | 4/2013 | Mok | H02J 9/005 307/23 |
| 2013/0093381 A1* | 4/2013 | McGinley | H02J 7/0068 320/107 |
| 2013/0120889 A1* | 5/2013 | Klesyk | 361/87 |

FOREIGN PATENT DOCUMENTS

| | | |
|---|---|---|
| EP | 1087494 A2 | 3/2001 |
| EP | 2383861 A2 | 11/2011 |
| WO | 2010099483 A2 | 9/2010 |

OTHER PUBLICATIONS

Second Office Action of Chinese Application No. 201280053276.5, 15 pages, Jul. 21, 2016.

* cited by examiner

US 9,805,890 B2

ELECTRONIC DEVICE STATE DETECTION FOR ZERO POWER CHARGER CONTROL, SYSTEMS AND METHODS

CROSS REFERENCE TO RELATED APPLICATIONS

This application claims the benefit of U.S. Provisional Patent Application Ser. No. 61/556,577 filed Nov. 7, 2011, the complete disclosure of which is hereby incorporated by reference in its entirety.

BACKGROUND OF THE INVENTION

The field of the invention relates generally to electronic controls for minimizing energy consumption of electrical appliances and devices when not in active use, and more specifically to electronic controls, systems and methods for power converters and charger devices for use with portable electronic devices.

For various reasons, electrical energy consumption is being increasingly scrutinized by residential and business customers. Much effort has been made in recent years to provide electronic appliances of all types that consume reduced amounts of electrical energy in use. Such appliances have been well received in the marketplace and are highly desirable for both residential and commercial consumers of electrical power. While great strides have been made in providing electrical appliances that reduce electrical energy consumption compared to conventional appliances, the appetite for still further energy consumption savings remains.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
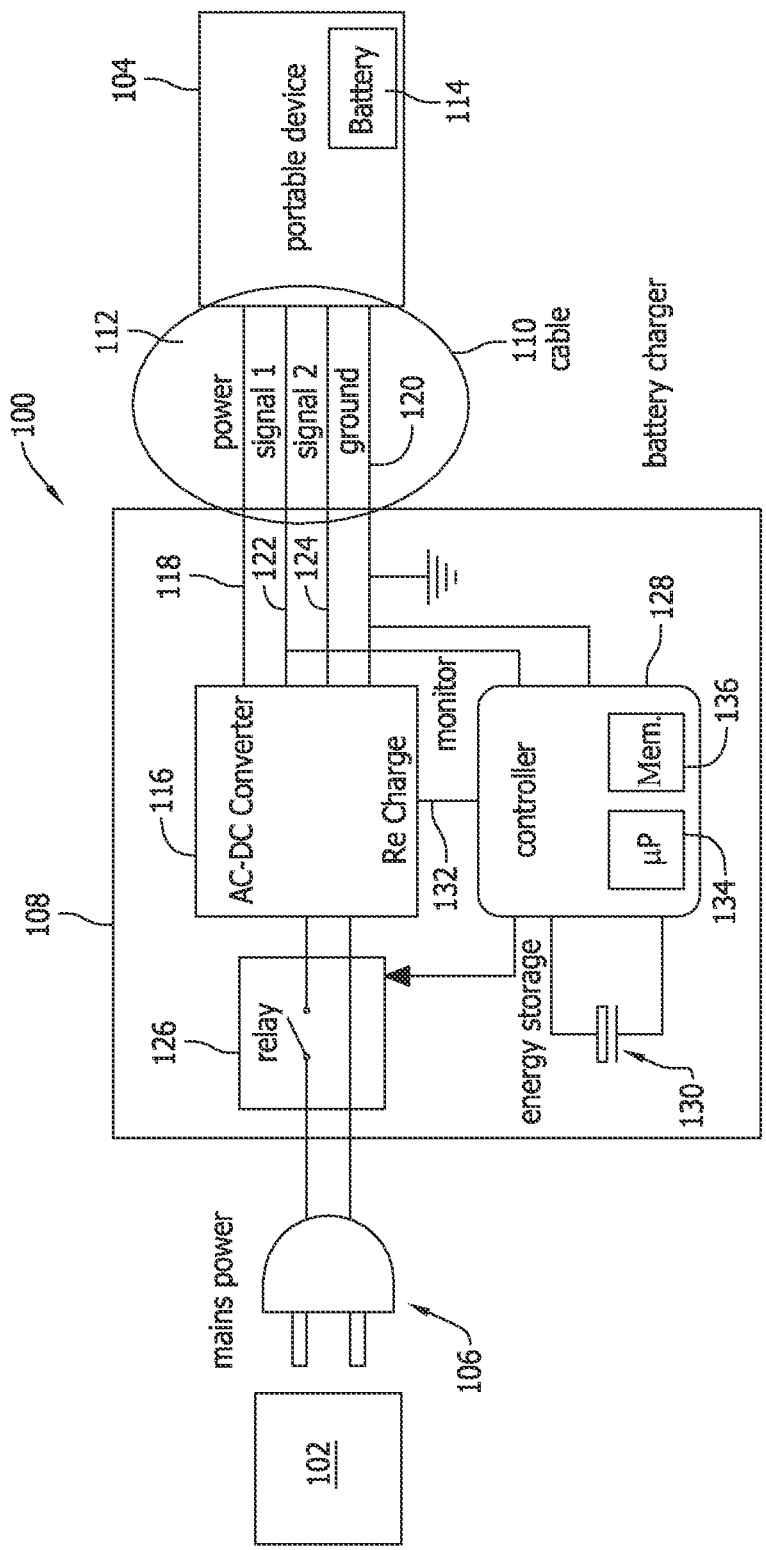
FIG. 1 schematically illustrates an exemplary system including a battery charger appliance interfacing a mains power supply and a portable electronic device, including control elements for the charger appliance that provide for charger state detection and disconnection from the mains power supply when battery charging is not needed.

A variety of portable or mobile electronic devices are known and in widespread use. Such portable or mobile electronic devices include devices such as cellular phones, smart phones, notebook or laptop computers, tablet computers, portable DVD players, audio and video media entertainment devices, electronic reader devices, portable gaming devices, portable global positioning system (GPS) devices, digital camera devices, and video recorders, among others. Such devices are conveniently enjoyed by scores of consumer electronic users worldwide and are highly desirable.

Such portable electronic devices are generally lightweight and relatively small, hand held devices that are easily moved from place to place. Such portable electronic devices typically include internal or on-board rechargeable battery power supplies. Because of the on-board power supplies, power cords and the like are not needed to operate the device, and the devices may be fully operational independently from any location of an external power supply for a limited time corresponding to the energy storage of the on-board power supply. The limited time may vary depending on actual use of the device.

Power adapters or converters, sometimes referred to as chargers, are available for such portable electronic devices. The chargers include power cords that interconnect the portable electronic device with an external power supply. Such chargers may convert, for example, AC electrical power from an external power supply, such as a commercial or residential power mains supply via a conventional power outlet, to appropriate DC power to power the electronic device. As another example, the converter may convert electrical power from a higher voltage external DC power supply, such as a vehicle battery power system, to appropriate DC power to operate the electronic device. When the portable electronic devices are connected to such external power supplies via the charger and associated cords, power is made available from the external power supply through the charger to re-charge the battery of the device and/or otherwise power the device via the external power supply.

Many consumers tend to plug the chargers for such devices into respective wall outlets and leave them plugged in, whether or not the charger is actually connected to the portable electronic device and being used. Instances wherein a charger is not connected to a mains power supply via a wall outlet, but not to a portable electronic device, are sometimes referred to as a no-load state or a no-load condition of the charger.

Many consumers fail to realize that conventional charger appliances, when connected or plugged-in to an external power supply, will continuously consume electrical power in a no-load state. In other words, if left plugged in to an external power supply, conventional chargers will operate to convert power, and hence consume power, even when the portable device is not connected to the charger. There is no benefit to such energy consumption in a no-load state. It is simply wasted power, and according to some, wasted power of the worst kind because it is completely avoidable, very common, and frequently overlooked.

Conventional charger devices also tend to use more energy than is required to charge a battery (or batteries) for portable electronic devices. This is because the charger is typically operated for much longer periods than is actually necessary to charge the battery of the device. Many consumers may not know that many types of chargers continue to draw power even after full charging of the battery or batteries in the electronic device has been achieved. In some cases, indicator lights and the like are provided to indicate to a user when the battery is charged, but only the most attentive consumers will monitor the battery charging closely and respond promptly to such indicators.

Further, most portable electronic devices nowadays enter a low power state, sometimes referred to as an idle state, when not in active use. Such idle states are provided to conserve the battery power and may allow for longer use of the devices before having to recharge the batteries. In many cases, when entering such an idle state the electronic device may appear to the observer to power down and turn itself off. Often, however, the device is never truly "off" in the idle state. This is perhaps counterintuitive to many consumers, and is compounded by the issues above, for the idle state may be entered while the device is connected to the charger. When this occurs, electronic devices in the idle state will consume power from the external power supply via the charger if it is connected.

Many consumers nowadays may own multiple portable electronic devices and may also own multiple chargers for their portable electronic devices. For households in which each member owns one or more devices and chargers, many of which will remain plugged into external power supplies when not used for charging, the issues are multiplied. The proliferation of business users of such portable electronic devices has in many cases led consumers to own more than one charger and keep them in different locations (e.g., at home and at work) and often the chargers are plugged in. When traveling, consumers are known to take their chargers with them and while they sleep, plug the chargers in to charge their electronic devices.

According to some reports, 10% to 15% of the typical electrical energy consumption per year in the typical household may be attributable to power consumed by electronic devices and appliances when in an idle state, a standby state, or in the case of charger appliances, a no load state. Hundreds of dollars per year may accordingly be spent in such households for powering various electronic appliances and devices when not in active use. Such power consumption is sometimes referred to as "vampire power" because it is both unsuspecting to many consumers and negatively parasitic by nature. Given the apparently never-ending proliferation of consumer electronic devices, such issues are becoming of increasing concern. For the typical household, the number of electronic devices and appliances contributing to vampire power issues is likely to grow over time, and as such these problems are likely to increase over time.

While efforts have been made to educate and inform energy consumers of such issues, the most typical remedy provided is to advise consumers to unplug their electronic devices and appliances, including chargers, when not in actual use to avoid wasted energy consumption. For many consumers, however, this is inconvenient and, in some cases, impractical advice.

For various reasons, electrical outlets are not always easily accessible, such that plugging in appliance devices, including but not limited to chargers, in certain locations can simply be challenging. In such cases once a charger device has been plugged into a power outlet, the incentive for a user to unplug it is minimal. Indeed, for avid consumer electronic users, just finding enough outlets to charge their devices can be a challenge, especially when traveling. Also, and especially for frequently used portable electronic devices needing frequent charging, many consumers find it simply easier to plug their chargers in at a convenient location and leave them in place rather to plug and unplug the chargers each time they are used. For some consumers with physical impairments, they may not be able to plug and unplug the charger devices to save energy even if they wanted to. Finally, there is, of course, a segment of the population that simply remains unaware of vampire power consumption issues, does not fully understand it or appreciate it, or has simply chosen to ignore it.

Adapters and chargers are available for powering portable electronic devices from vehicle electric systems as well, with similar issues and results. Modern vehicles today are typically provided with a number of power outlets distributed throughout the vehicle to accommodate a number of such portable electronic devices at various locations in the vehicle. However, many a vehicle owner has encountered a dead battery because of a connected portable electronic device that drained the vehicle battery while the vehicle was parked with the ignition off for some period of time. Such surprises are, of course, unwelcome, and this is another area where many consumers may fail to understand how the portable devices and/or their chargers or adapters actually operate. Such confusion is perhaps only increased as some types of portable devices, when used with their chargers/adapters in a vehicle, are designed to recognize when the ignition has been turned off and power themselves down to minimize any chance of draining the vehicle battery. While some devices certainly do effectively function in such a manner, not all of them do and problems remain.

Likewise, modern vehicles can include intelligent features to disconnect devices to prevent the vehicle battery from being depleted. Connected devices may, for example, automatically be disconnected after a certain period of time after the vehicle ignition is turned off. Such features, however, may typically be switched on or off by the user of the vehicle, knowingly or unknowingly. Thus, confusion and problems may nonetheless result that will defeat even well designed vehicle system features to prevent inadvertent power drains of the vehicle battery.

While various systems and methods have been proposed for counteracting wasteful energy consumption of the type described in various applications, none is believed to have provided a simple, practical, convenient and affordable solution. Rather, existing systems and methods designed to address such issues are believed to be complicated, unnecessarily expensive, impractical or inconvenient, and subject to human error.

Exemplary electrical device and appliance controls, systems and methods are described hereinbelow to automatically disconnect a charger appliance from an external power supply (e.g., AC power mains or a vehicle battery) when in a no-load state. As such, the charger appliance can detect the no-load state and disconnect itself from the external power supply. Consequently, the charger appliance can remain plugged into a power outlet associated with an external power supply, without needlessly consuming power in a no-load state.

As described in detail below, the charger appliance can intelligently detect whether or not the charger appliance is connected (or not) to the portable electronic device, and when the charger is disconnected from the portable electronic device, the charger is automatically switched off and disconnected from the external power supply so that it no longer wastefully consumes power. Further, the charger application can intelligently detect when it is reconnected to the portable electronic device, and accordingly reconnect to the main power supply when use of the charger appliance is required or desired. Such connection and reconnection is provided in a relatively simple and low cost manner.

Implemented in processor based controls, the inventive controls, systems and methods eliminate wasted no-load power consumption of charger devices, and also obviate any need to unplug the electrical device or appliance from the main power supply. Users of the electronic devices may continue to conveniently use the chargers as before, and need not unplug them, while nonetheless achieving substantial energy savings. Any of the electronic devices and appliances discussed above may benefit, as well as others. The devices and applications described herein are exemplary only, and are provided for the sake of illustration rather than limitation. Any electric appliance or device presenting similar energy consumption issues to those described above may benefit from the inventive concepts disclosed, whether or not specifically referenced in the present disclosure.

Controls, systems and methods for operating an electrical device such as a charger appliance or charger device are described hereinbelow wherein the device detects whether or not it is connected to a portable electronic device, and based upon such detection can intelligently connect or disconnect the charger from an external power supply so that it consumes no power from the external power supply. Exemplary embodiments of charger devices and methods are directed specifically in the examples disclosed to a battery charger that is capable of providing charging power to the portable device through a standard cable that connects to the portable device via a standardized input, although other variations are possible. For example, the intelligent charging features described below can alternatively be integrated into a wall outlet or a power receptacle in a vehicle battery system to provide intelligence regarding whether the wall outlet or power receptacle is connected to an electronic device or another power receiving device and avoid wasteful power consumption.

In contemplated embodiments, the battery charger specifically disconnects itself from the external power supply, sometimes referred to herein as a mains power supply, when battery charging via the charger is not needed. This is accomplished via active monitoring of control inputs that indicate when charging power is required (or not) so that the battery charger appliance may disconnect or reconnect the mains power on demand. For discussion purposes, charging power is required or demanded when a portable device is connected to the battery charger using a standard charging cable or cord that is compatible with the portable device. Via monitoring of at least one of the signal lines that is present in the standard cable, and specifically by monitoring a voltage of one or more of the signal lines and detecting changes in the voltage, connection and disconnection of the standard cable to and from the portable electronic device can be reliably detected. Such state detection for the charger can then be utilized as a basis for the charger controls to disconnect or reconnect to the mains power supply.

Turing now to FIG. 1, a system including a charger appliance 100 is shown. The charger appliance 100 interfaces and interconnects an external mains power supply 102 with a portable electronic device 104.

The charger appliance 100 in the example shown includes a plug 106 connectable to the mains power supply 102 via a standardized outlet, control circuitry 108, a cable or cord 110, and a connector 112 that establishes an electrical connection with the portable electronic device 104 via a mating connector provided on the electronic device 104. Alternatively, the control circuitry can be integrated in the power supply via a wall outlet or a power receptacle, which may be adapted to directly receive the cable 110 supplying power to the electronic device 104. That is, the wall outlet may, for example, be configured with a Universal Serial Bus ("USB" port) or other interface to establish direct connection with the mains power supply, without necessarily involving the intermediate plug 106. In such an embodiment, any power conversion and monitoring described below may be integrated into the wall outlet or power receptacle. Whether provided as a conventional adapter with the plug 106, or as an intelligent power outlet or receptacle, however, the control features operate in a similar manner as described below in relation to various exemplary embodiments.

Depending on the detected state of the charger appliance 100 as described below, the control circuitry 108 can disconnect and electrically isolate itself from the mains power supply 102, as well as reconnect to the mains power supply 102 when charging power is needed. That is, the control circuitry 108 can intelligently decide whether power from the external mains power supply 102 is needed (or not) to charge the internal or on-board battery power supply 114 of the portable electronic device 104, and thus operate the charger appliance 100 with no wasted power when the charger 100 is not needed by the electronic device 104. The charger 100 is therefore sometimes referred to as a zero power charger as it consumes no power when it is disconnected from the mains power supply 100.

The mains power supply 102 may, for example, supply an alternative current (AC) mains voltage such as 120V, 60 Hz, single phase power common to residential power systems, although other types of AC power supplies are possible operating at different voltages, different frequencies or having various numbers of phases. It is also recognized that the mains power supply 102 may alternatively be, for example, a 12V to 15V, direct current (DC) power supply such as a storage battery or batteries of a vehicle electrical power system. In a vehicle system, the battery or batteries corresponding to the mains power supply 102 may be part of a main power system or an auxiliary power system for operating accessories and auxiliary applications of the vehicle. While one type of interface plug 106 is shown in FIG. 1, it is recognized that differently configured interface plugs may be necessary to connect the charger 100 and the mains power supply 102 to various types of AC and DC mains power supplies. Such interface plugs are generally known and are not described further herein.

In the context of a vehicle and various electrical devices and appliances connected to the vehicle electric system, the vehicle may in various exemplary embodiments be a passenger vehicle (e.g., motorcycles, cars, trucks and buses designed for road use), a commercial vehicle (e.g., tractor trailers, mail trucks, delivery vehicles, garbage trucks and haulers, forklifts), construction vehicles (e.g., diggers, backhoes, bulldozers, loaders, and earthmoving equipment, graders, rollers, dump-trucks), vehicles of all types equipped for military use, vehicles designed for off-road use (e.g., tractors and other farm vehicles, four wheel drive vehicles, sport utility vehicles, all terrain vehicles, dirt bikes, dune buggies, rock crawlers, sandrails, snowmobiles, golf carts), various types of marine vehicles (e.g., ships, boats, submarines, personal watercraft and other vessels), various types of aircraft (e.g., planes and helicopters), space vehicles (e.g., missiles, rockets, satellites and shuttles), recreational vehicles (e.g., RVs and camper trailers), or other modes of transporting persons or things that are propelled and/or powered by mechanical, electrical and other systems and subsystems.

It is also contemplated that in some embodiments the "mains power supply" 102 as schematically shown in FIG. 1 could be performed by another electronic device, whether or not a portable electronic device. That is, certain types of electronic device are capable of powering other electronic devices using known connection ports and protocols. It is therefore possible that a first electronic device could be connected to an AC or DC mains power supply (whether or not through a charger), and the first device could supply output power to a second electronic device 104. That is, an indirect connection between the charger 100 and the mains power supply 102 may possibly be established through another electronic device. In such a scenario, the converter circuitry 116 may or may not be utilized to supply appropriate charging power to the device 104. As one example, a portable electronic device such as a smart phone may be interfaced with a computer via a USB port or other interface, and the computer may accordingly supply power to the portable electronic device either from its own battery storage or from the mains power supply when the computer is connected thereto with its own power cord or docking station.

It should now be clear that, if used with an appropriate charger 100, the portable electronic device 104 may interface with various types of mains power supplies 102. As such, an owner of a portable electronic device 104 may conveniently own different chargers for use with different mains power supplies 102. On this note, the charger 100 may or may not be supplied with the portable electronic device 104, but rather the charger(s) 100 may be purchased separately from the device 104 as an accessory. Furthermore, when standardized cables 110 and connectors are utilized with compatible electronic devices 104, it is possible for a single charger 100 to supply charging power to a plurality of electronic devices 104. It is likewise possible for a charger 100 to be configured to simultaneously charge more than one device 104, and if so the state detection features as described below could be utilized to detect the state of the charger 100 with respect to a plurality of devices 104.

The control circuitry 108 in the example shown includes an AC/DC converter (or converter circuitry) 116 which, when connected through the charger 100 to the mains power supply 100, supplies battery charging power to the portable device 104 over a power line 118 that is included within the standard cable 110. It is understood, however, that in alternative embodiments the converter circuitry 116 may be a DC/DC converter depending on the mains power supply being utilized.

The cable 110 as shown includes a power line 118, a common ground 120 and signal lines 122 and 124. In other embodiments, other numbers of signal lines may be provided. The cable 100 may include a connector at one or both ends thereof in order to establish mechanical and electrical connection with the portable device 104 and the control circuitry 108 of the charger 100 if desired. The portable electronic device 104 and the charger 100 may be provided with mating connectors to those provided on the cable to establish the mechanical and electrical connections. Such connectors may be one of a variety of known plug and socket type connectors or other types of connectors known in the art. In another contemplated embodiment, the cable 110 may be pre-attached to the charger 100 in a permanent manner such the user need only be concerned with making or breaking the mechanical and electrical connection with the portable electronic device 104.

The charger appliance 100 as shown further includes a switch 126 such as a latching relay familiar to those in the art. The switch 126 may include one or two poles, for example, and is selectively operable to opened or closed positions to respectively disconnect or connect the mains power 102 from the converter circuitry 116 in response to a control signal provided by a monitoring device or controller 128. When the switch 126 is opened as shown in FIG. 1, the converter circuitry 116 is electrically isolated from the mains power supply 102. As a result, no current flows from the mains power supply 102 to the converter circuitry 116 and no power is consumed from the mains power supply 102. When the switch 126 is closed, however, an electrical path is completed between the mains power supply 102 and the converter circuitry 116 through which current may flow from the mains power supply 102 to the converter circuitry 116, which supplies output power to the cable 110 via the power line 118. The power line 118 in the cable 100, in turn, may supply charging power to recharge the battery 114 in the electronic device 104 when the cable 110 is connected to the device 104.

The charger 100 further includes a monitoring device 128, sometimes referred to as a controller, that derives energy for continuous operation, as also shown in FIG. 1, from an energy storage device 130 while the mains power 102 is disconnected from the converter circuitry 116 via the switch 126. In various contemplated embodiments, the energy storage device 130 may be a capacitor or a battery. The energy storage device 130 in one contemplated embodiment is preferably a supercapacitor generally having less storage capacity than a battery of similar size, although other energy storage devices including but not limited to batteries could potentially be used in other embodiments.

When the mains power 102 is connected via the switch 126, the energy storage element 130 is re-charged via a re-charge output 132 of the converter circuitry 116. The controller 128 operates the switch 126 to connect and disconnect the mains power supply 102 to the converter 116 to ensure that the energy storage element 130 is able to power the state detection features described hereinafter.

In the example shown, the controller 128 is a programmable processor-based device including a processor 134 and a memory storage 136 wherein executable instructions, commands, and control algorithms, as well as other data and information to operate the charger 100 are stored. The memory 136 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The controller 128 in the exemplary embodiment shown in FIG. 1 monitors a voltage condition of the first signal line 122 to detect any voltage change on the first signal line 122. More specifically, the controller 128 may apply a voltage to the first signal line 122 via the energy storage element 130 at a first voltage and measure the voltage via a feedback input to the controller 128. When the cable 110 is connected to the portable device 104 the monitored voltage on the first signal line 122 will be different from the applied voltage. The controller 128 accordingly detects this change in voltage on the first signal line 122, and in response operates the relay 126 to re-connect the mains power supply 102 to the converter circuitry 116. Electrical power, from the external mains power supply 102, is then delivered by the converter circuitry 116 to the portable device 104 via the power line 118 in the cable 110. At the same time, the energy storage device 130 is re-charged to its full capacity.

When the cable 110 is disconnected or removed from the portable device 104, the voltage on the first signal line 122 again changes. The change is detected by the controller 128, which continues to monitor the first signal line 122 while the battery 114 of the portable device 104 is charged. In response to disconnection of the cable 110 from the portable electronic device 104, the controller 128 operates the relay 126 so that mains power 102 is disconnected from the converter circuitry 116. At this point, the converter circuitry 116 receives no power from the external mains power supply 102, and the controller 128 is powered, for monitoring purposes only, by the energy storage device 130. In this manner, the charger 100 wastes no energy during the time a portable device 104 is disconnected from it (i.e., the no-load state discussed above wherein the cable 110 is disconnected from the electrical device 104).

Various examples are described below in which state detection for the charger 100 is made possible by monitoring voltages on one or more of the signal lines 122 or 124, with the controller 128 otherwise offering similar functionality in response to detected changes in state of the charger 100. The controller 128 may effectively determine whether the portable device 110 is coupled to the charger 100 via connection of the cable 110, or uncoupled from the charger 110 via disconnection of the cable 110. By determining such coupling and uncoupling of the cable 110 and the portable device 104, power can be supplied to the device 104 through the charger 104 only when the device 104 is connected, and energy consumption of the charger 100 while the device is disconnected can be effectively eliminated.

Figure 2:
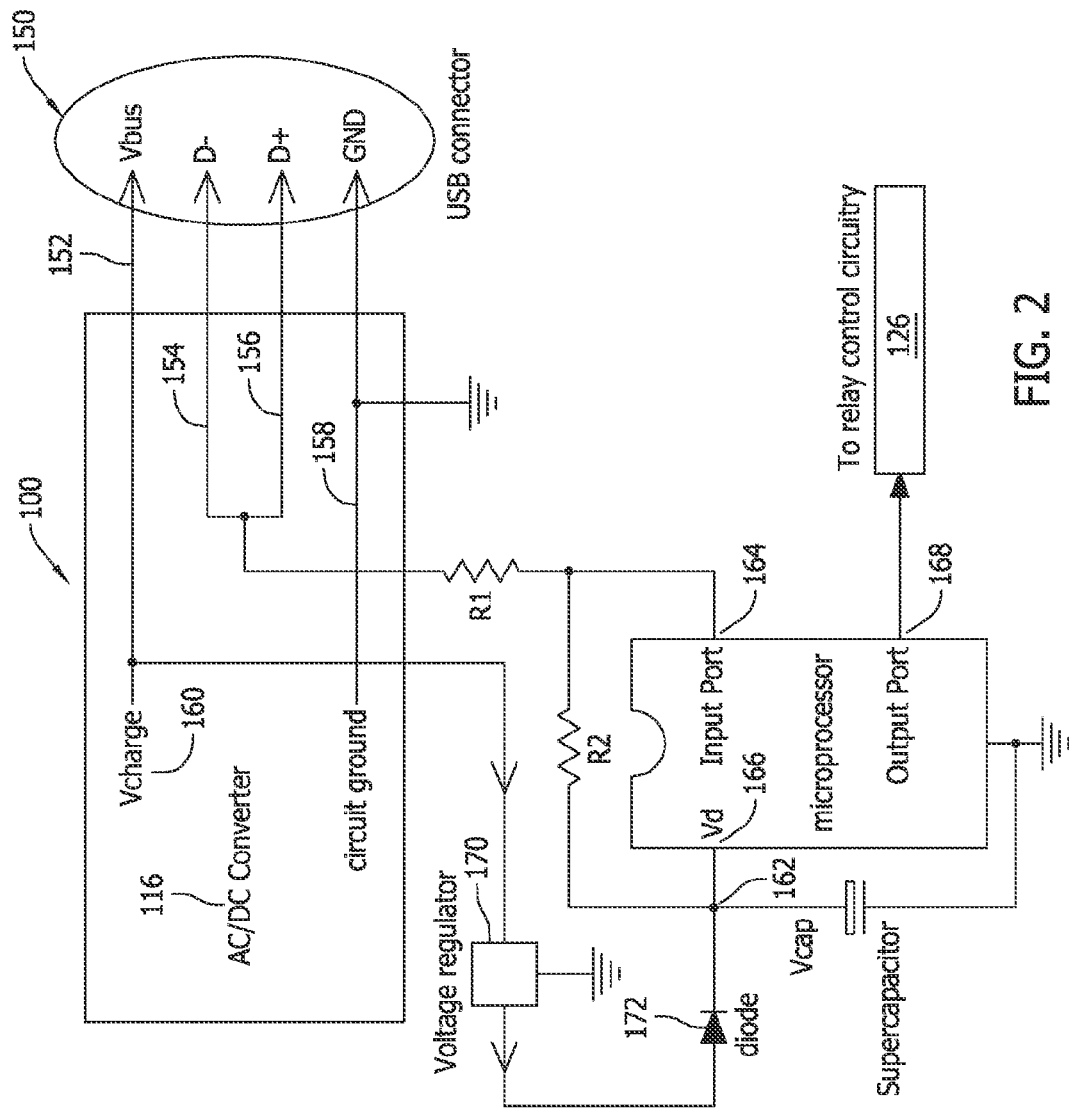
FIG. 2 further schematically illustrates a first exemplary implementation of the charger appliance shown in FIG. 1.

Turning now to FIG. 2, further details of one exemplary implementation is described. The standard cable 110 (FIG. 1) in this example is a Universal Serial Bus (USB) cable with a USB connector 150 interfacing to the battery charger 100. Such a USB cable interface includes, as shown in FIG. 2, a power line 152 and a corresponding contact shown as Vbus in the connector 150, two signal lines 154 and 156 and corresponding contacts shown as D− and D+ in the connector 150 shown in FIG. 2, and a ground line 158 and corresponding contact in the connector 150 shown as GND in FIG. 2. When the connector 150 is interfaced with the device 104, corresponding contacts in the device 104 are electrically connected to the Vbus, D− and D+ contacts in the connector 150.

When the converter circuitry 116 is connected to the mains power supply 102 (FIG. 1), the converter circuitry 116 outputs a voltage 160 shown as Vcharge in FIG. 2 onto the Vbus power line 150. In this example, the USB Specification defines Vcharge 160 to be 5 volts DC. The signal lines 154 and 156 (D− and D+) are shorted together in this example within the battery charger 100. According to the USB-IF Battery Charging Specification this shorted condition of the signal lines 154 and 156 can be used by the portable electronic device 104 (which is provided with a mating connector to the connector 150 shown) as an indication that the portable device 104 is connected to a Dedicated Charger Port or dedicated charger device.

The shorted signal lines 154 and 156 are biased through biasing resistors R1 and R2 to a voltage equal to Vcap 162. Vcap 162 corresponds to the voltage supplied by the energy storage device 130 or a supercapacitor in the example of FIG. 2. Vcap 162, in one example, is set to 3.6 volts, although other voltages could be used if desired. When no portable device 104 is connected via the connector 150, the signal lines 154 and 156 (D− and D+) are accordingly biased to Vcap or 3.6 volts. This biased voltage is sensed by the controller 128 (a microprocessor in this example) at its input port 164, which in turn is connected to the node between R1 and R2. In one example, R1 is selected to be 10 Kohms and R2 is selected to be 1.0 Mohms.

The controller 128 includes a microprocessor and is typically a very low power consuming device. Suitable microprocessor devices are known for use as the controller 128, including but not limited to a microcontroller having part number PIC16LF1823 manufactured by Microchip (www.microchip.com) of Chandler, Ariz. Programmatically, the microcontroller 128 spends most of its time in a deep sleep mode when no portable device 104 is present (i.e., the no-load state wherein the cable 110 is not connected to the portable device 104). In the deep sleep mode such a microcontroller 128 draws only a fraction of 1 microamperes of current from its voltage supply at input 166, also shown as Vd in FIG. 2. Since Vd is supplied by the energy storage device 130 (the supercapacitor in this example), it takes a very long time before Vcap 162 decreases to a point where the energy storage device 130 needs to be re-charged.

The input port 164 of the microcontroller 128 is programmatically configured so that any voltage change on it will wake up the microprocessor 128 from its deep sleep mode. Such a port programming feature is known and not described further herein.

When no portable device 104 is present, a stable voltage of magnitude Vcap exists at the input port 164 of the microcontroller 128. The moment a portable device 104 is connected (i.e., the cable and connector 150 are mated with the portable electronic device 104), the signal lines 154 and 156 (D− and D+) together will be pulled down from the voltage Vcap to a voltage of nearly 0 volts. Consequently, the input port voltage will similarly be pulled down. This voltage change, detected via the input port 164, will wake up the microcontroller 128. Programmatically, the microcontroller 128 will verify that the input voltage has changed to a value that indicates a portable device 104 is present (i.e., about 5 volts in the USB example shown). Once this is verified, the microcontroller 128 will then output a voltage at the output port 168 as a signal command to operate the relay 126 (FIG. 1) in order to connect the mains power supply 102 to the converter circuitry 116 in the charger 100. Subsequently, the voltage 160 (Vcharge) will appear from the AC/DC converter and provide charging power to the Vbus line or power line 152. Additionally, the voltage Vcharge will re-charge the energy storage device 130 (a supercapacitor in this example) through a voltage regulator 170 and a diode 172. The voltage regulator 170 steps Vcharge (5 volts in this example) down to Vcap (3.6 volts)

and the diode 172 prevents the supercapacitor 130 from discharging back through the voltage regulator 170 during times when the converter circuitry 116 is disconnected from the mains power supply 120 via the relay switch 126.

Once the switch 126 connects the converter circuitry 116 to the mains power supply 102, the microcontroller 128 continues to monitor the magnitude of the voltage present at the input port 164. This input voltage will return to a value of Vcap (3.6 V in this example) when the cable 110 and connector 150 are detached from the portable device 104 and the no-load state results. Once the microcontroller 128 senses this no-load state or condition, it will set the output voltage at the output port 168 so as to cause the relay switch 126 to disconnect the mains power supply 102 from the converter circuitry 116. The microprocessor 128 at this point returns to the deep sleep state and awaits for another change in state of the charger 100, corresponding to its re-connection with a portable device 104, or perhaps connection to another portable device 104 that is also compatible with the charger 100.

To account for a possible circumstance where the electronic device 104 is re-connected (or another portable device is connected) only after a very long period of time, the microcontroller 128 is programmatically configured to wake up at regular intervals for a short time. This timed wake up feature is commonly found on available microprocessors/microcontrollers. During the wake period the microcontroller 128 measures the value of Vcap by measuring the voltage at the input port 164. If the value of Vcap is found to be at or below a threshold value (for example, 2.5 volts), then the microcontroller 128 operates the relay switch 126 in order to connect the mains power supply 102 to the converter circuitry 116 for a fixed or predetermined period of time. During this period of time the converter circuitry 116 re-charges the supercapacitor back to 3.6 volts in this example through the voltage regulator 170. At the end of the fixed time period the microcontroller 128 returns to the deep sleep mode after re-setting the timed wake up feature.

If, on the other hand, after the microcontroller 128 wakes up, the microprocessor instead measures a value of Vcap that is acceptable (i.e., above the predetermined threshold or 2.5 volts in this example), the microprocessor immediately returns to the deep sleep mode after re-setting the timed wake up feature.

Figure 3:
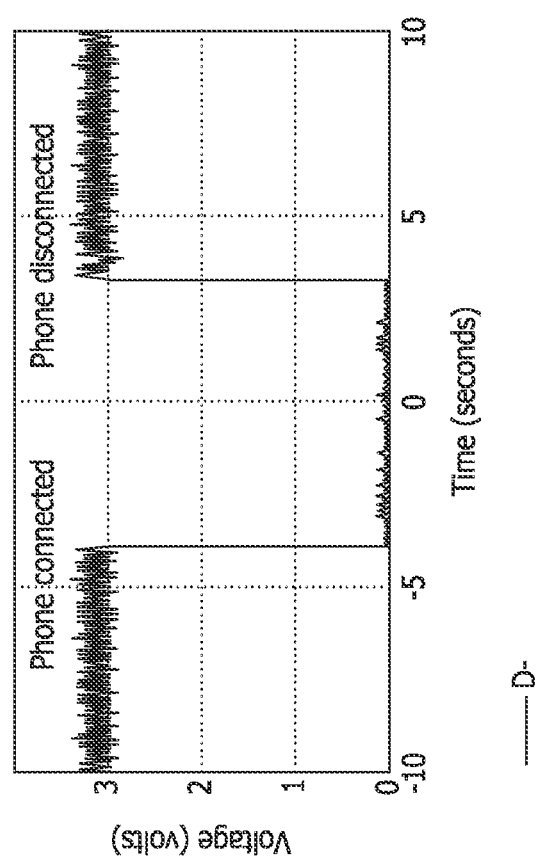
FIG. 3 is an exemplary voltage versus time plot illustrating charger state detection for the exemplary charger appliance shown in FIG. 2.

A demonstration of the example in FIG. 2 is shown in FIG. 3. A test electronic device 104 in the form of a cellular phone that complies with the USB-IF Battery Charging Specification was connected to a test circuit that applied 3.5 volts through R2 (a 1.0 Mohm resistor) to signal line 154 (the line D− in FIG. 2) that is shorted to signal line 156 (the line D+ in FIG. 2). The voltage at D− was measured and is shown plotted versus time in FIG. 3. As can be seen in FIG. 3, the voltage changes and voltage magnitudes are easily detectable by the microcontroller 128. The measured voltage can be seen being pulled down from a stable voltage of about 3.6V (equal to Vcap) to about zero when the charger 100 is connected to the portable device 104, and the voltage rising back to Vcap when the charger 100 is disconnected from the portable device 104. The controller 104 can accordingly detect the state of the charger 100 as being connected or unconnected with the portable device 104 at any given point in time, and can operate the relay switch 126 to avoid wasteful power consumption when the no-load state exists.

Figure 4:
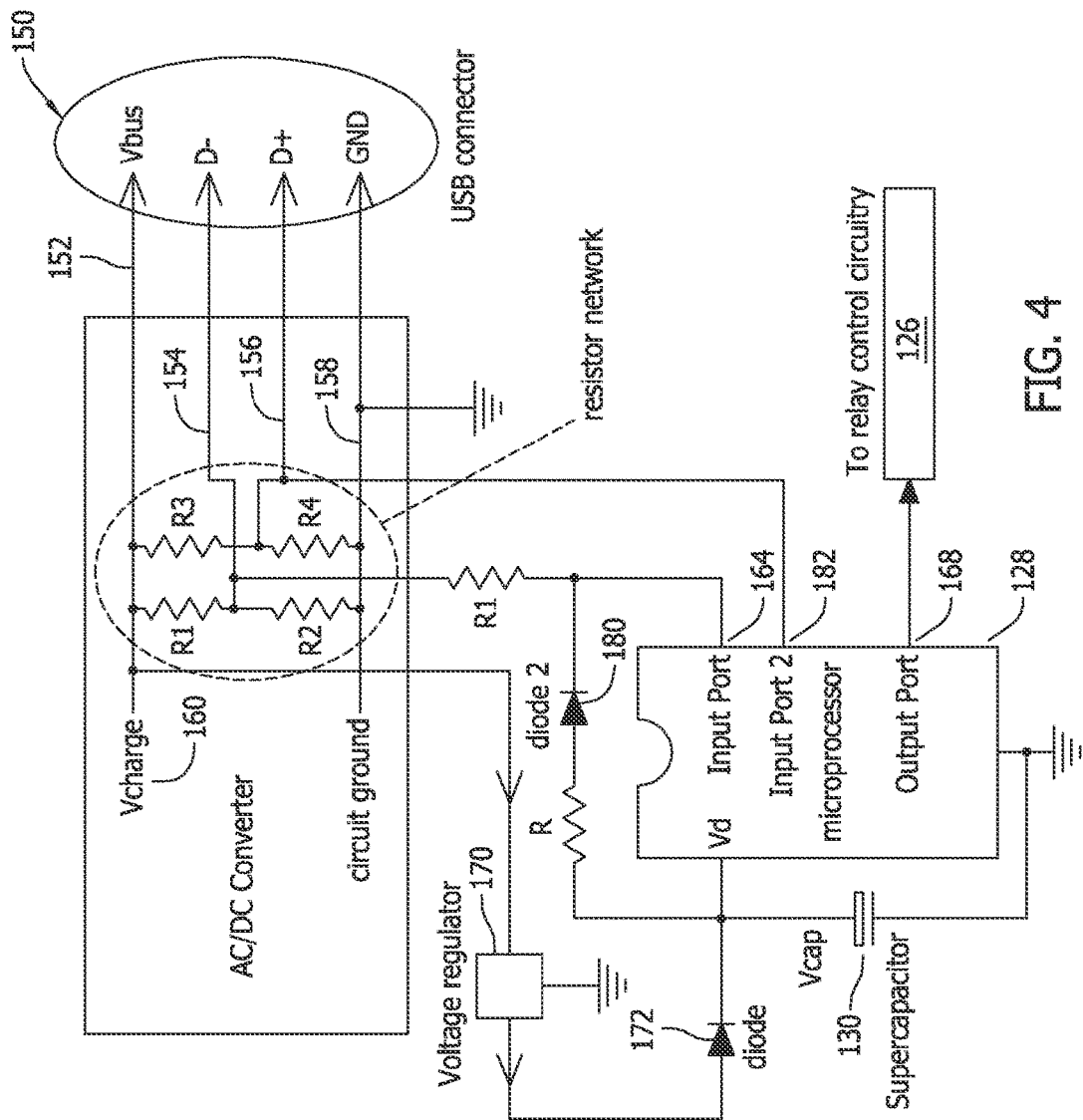
FIG. 4 schematically illustrates an alternative embodiment of an exemplary charger appliance.

FIG. 4 illustrates another exemplary embodiment wherein the portable device 104 does not comply with the USB-IF Battery Charging Specification, but uses an alternative method adopted by the manufacturer of the portable device 104 for determining whether or not the device 104 is connected to a dedicated battery charger.

As shown in FIG. 4, the portable device manufacturer's method of detecting the battery charger involves measuring the voltage on the signal lines 154 and 156 (D− and D+) after Vcharge 160 (about 5 volts in this example) appears on the power line 152 or Vbus. To do so, a resistor network is provided, and in one example the values of the resistances in the resistor network shown are R1=75 Kohms, R2=49.9 Kohms, R3=43.2 Kohms, and R4=49.9 Kohms. Analysis easily shows that the network will impress 2.7 volts onto the signal line D− and 2.0 volts onto the signal line D+. After detection of these voltages on the respective signal lines, the portable device 104 then permits charging to proceed.

As in the previous example (FIG. 2) when no portable device 104 is connected and when the switch 126 is opened, Vcharge is 0 volts and Vcap (about 3.6 volts) is applied to the signal line D− through resistor R and a second diode 180. In this example shown in FIG. 4, R is selected to be 11 Kohms and diode 2 is present so that the energy storage device 130 (a supercapacitor in the example) is not exposed to the 5 volts that will appear on Vbus when the switch 126 is closed and the converter circuitry 116 is connected with the mains power supply 102.

When the portable device 104 is connected to the charger in the example of FIG. 4, the input port 164 of the microcontroller 128 will abruptly change voltage, which in turn wakes up the microprocessor. The microcontroller 128 proceeds to command the switch 126 to connect the mains power supply 102 to the converter circuitry 116, which then impresses the voltage Vcharge (about 5V on this example) onto the power line 152 or Vbus. At this point in time the resistor network impresses the correct voltages on the signal lines 154 and 156 (D− and D+), which is sensed by the portable device 104. The portable electronic device 104 then permits charging of the battery 114 (FIG. 1) to proceed.

The microcontroller thereafter monitors a voltage at a second input port 182, which is connected to the signal line 156 or D+. When the portable electronic device 104 is disconnected from the cable 110 or the USB connector 150, the voltage on the signal line 156 (D+) changes magnitude and is thereby easily measured by the microprocessor. The microcontroller 128 then proceeds to command the switch 126 to disconnect the mains power supply 102 and return to a deep sleep mode.

As such, the microcontroller 128 monitors a change in voltage of the first signal line 154 to sense a first change in state of the charger (i.e., connection of the charger to the portable electronic device 104 via the cable 110) and monitors a change in voltage of the second signal line 156 to sense a second change in state of the charger (i.e., a disconnection of the charger from the portable electronic device 104 via disconnection of the cable 110). It is understood, however, that this arrangement may effectively be reversed in another embodiment.

Figure 5:
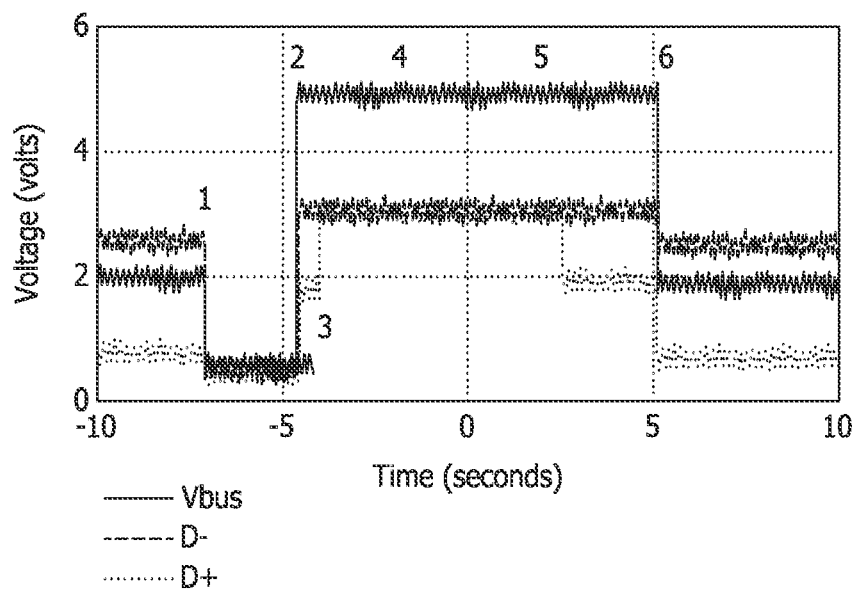
FIG. 5 is a first exemplary voltage versus time plot illustrating charger state detection for the charger appliance shown in FIG. 4.

A demonstration of the example shown in FIG. 4 is seen in FIG. 5. A test electronic device 104 having the portable device manufacturer's method of detecting the battery charger as describe above was connected to the control circuitry described in relation to FIG. 4. The voltages at Vbus, D− and D+ were measured and are shown plotted versus time in FIG. 5.

Prior to time point 1 in FIG. 5 only the bias provided from Vcap through the resistors appears at Vbus, D−, and D+. Because of the resistor divider network the voltages of Vbus, D−, and D+ are each different from one another.

At time point 1 the portable device 104 is connected to the charger and all three voltages of Vbus, D−, and D+ are pulled down to a low value of well less than a volt. The voltage change on D− is large and wakes up the microcontroller 128 at this point. The controller 128 commands the switch 126 to close and at time point 2 the converter circuitry 116 applies about 5 volts to Vbus. As a result, the voltages at D− and D+ immediately change to values determined by the resistor network.

At time point 3 the electronic device 104 responds by pulling D+ to a value approximately equal to the voltage on D−.

At time point 4 the electronic device 104 begins to draw charging power.

At time point 5 the electronic device 104 is manually disconnected from the battery charger and the no-load state results. It is noted that at time 5 the voltage on D− does not change. However, the voltage at D+ immediately drops back to the resistor network—determining value of about 2 volts. The microcontroller 128 may easily detects this voltage change at the second input port 182 (FIG. 4) and commands the switch 126 to open and disconnect the converter circuitry 116 from the mains power supply 102.

At time 6, the mains power supply 102 is disconnected and all voltages Vbus, D−, and D+ return to the values they were prior to time point 1.

FIGS. 2-5 therefore illustrate that monitoring of signal lines can be applied to a variety of differently configured portable electronic devices 104 to be used with the battery charger.

Figure 6:
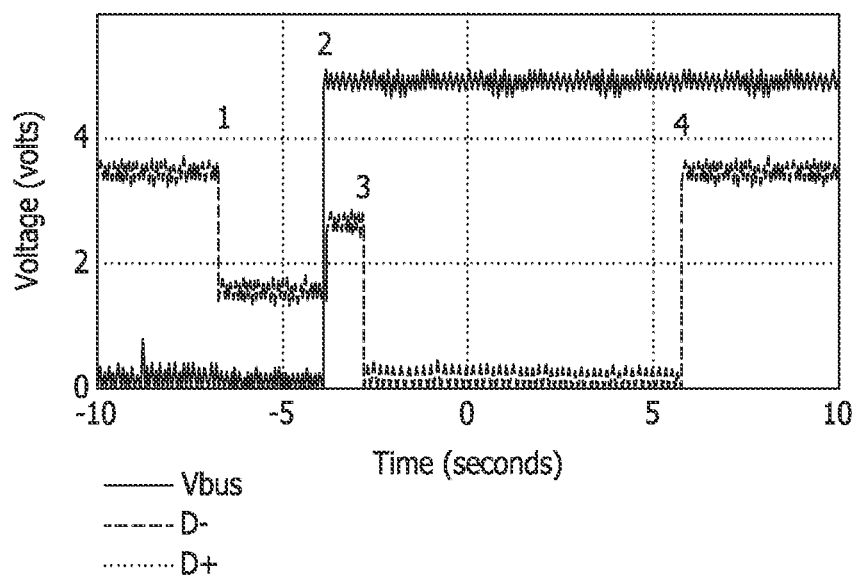
FIG. 6 is a second exemplary voltage versus time plot illustrating charger state detection for the charger appliance shown in FIG. 4.

FIG. 6 demonstrates yet another configuration can be used to detect portable device connection and disconnection by using the monitoring of signal lines. The circuit used to generate the plot in FIG. 6 is identical to that shown in FIG. 2 and described above, except that R2 is selected to be about 11 Kohms and R1 is 0 ohms. A test portable electronic device in the form of a cell phone that complies with the USB-IF Battery Charging Specification was connected to the circuit and the voltages of Vbus, D−, and D+ were measured and plotted in FIG. 6.

As before, time point 1 corresponds to the time of connection of the electronic device to the battery charger. Time point 2 corresponds to the battery charger application of Vcap (about 3.6 volts in this example) to Vbus. Time point 3 corresponds to the response of the electronic device 104 when it detects that a valid dedicated charging port has been connected. Time point 4 corresponds to the portable electronic device 104 being manually disconnected from the battery charger, resulting in the no-load state.

The voltage change on the input port 164 (FIG. 2) at time point 1 can result in detection of the electronic device connection by waking up the microcontroller, and the voltage change on the input port 164 at time point 4 can result in the detection of the disconnection of the electronic device from the charger.

FIG. 6 suggests that yet another method of detecting a connection and a disconnection of a portable device with the charger can be instituted while monitoring the signal lines with the microcontroller. Instead of using the wake up on voltage change feature of the microprocessor via the input 164, the timed wake up feature of the microcontroller 128 can be used. For example, at a predetermined interval (e.g., every one minute) the microcontroller 128 can programmatically wake up and connect the mains power supply 102 via the switch 126. After more than two seconds it can measure the voltage on D− at the input port 164. If the measured voltage is near zero, it can conclude that a portable device is connected and requires charging to continue. If the voltage is measured to be a value nearly equal to 3.6 volts, a value that is found prior to time point 1 or after time point 4 in FIG. 6, then it can conclude a portable device is not connected and it can return to a timed deep sleep mode.

This case is considered in more detail in the following example wherein the connecting portable device 104 is a cell phone that complies with the USB-IF Battery Charging Specification such as was used in the example of FIG. 6. Furthermore, the bias voltage applied to signal lines D− and D+ derives from Vcharge through a resistor network and Vcap only powers the microprocessor. The configuration is shown in FIG. 7.

Figure 7:
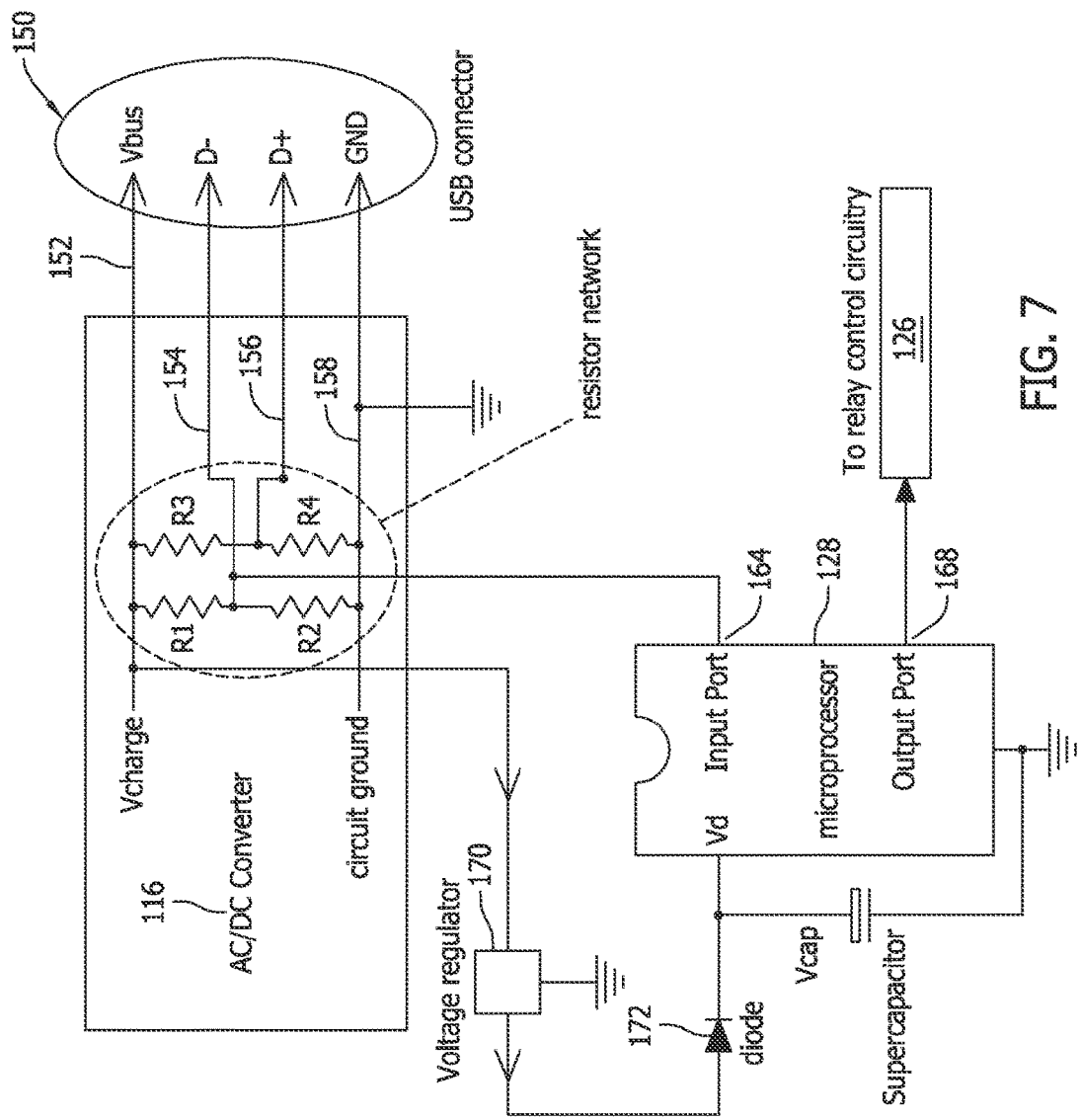
FIG. 7 schematically illustrates an alternative embodiment of an exemplary charger appliance.

The microcontroller 128 in the configuration shown in FIG. 7 wakes up after a timed period of deep sleep and applies mains power 102 via the switch 126. It then monitors signal line D− at the input port 164 and observes the behavior plotted in FIG. 8.

Figure 8:
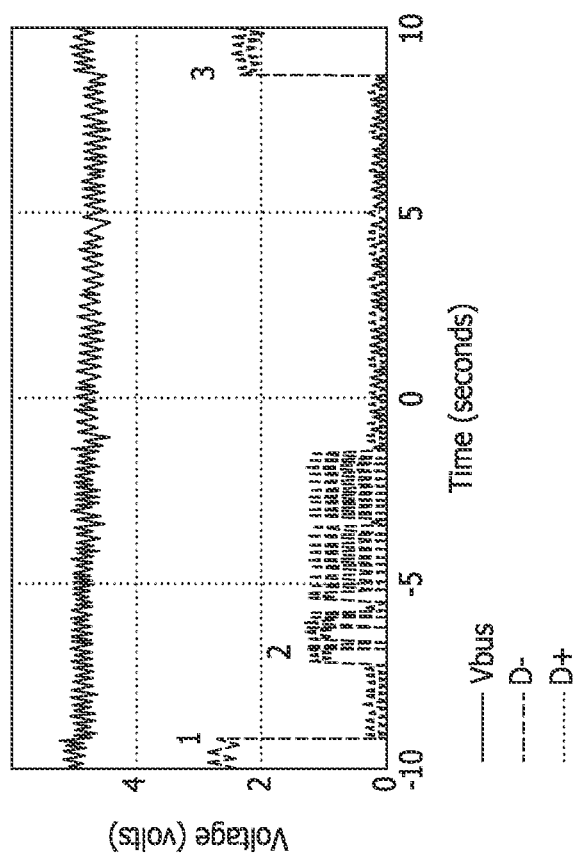
FIG. 8 is a first exemplary voltage versus time plot illustrating charger state detection for the charger appliance shown in FIG. 7.

As seen in FIG. 8, Vcharge (about 5.0 volts in this example) appears on Vbus at time=0 seconds. D− and D+, which are shorted together, are biased through the resistor network to a value of about 2.5 volts. A short time later at time point 1 the electronic device 104 begins to charge and responds by pulling D− (and D+) to near zero volts. The microcontroller 128 detects this value of zero volts and continues to permit charging while continuing to monitor signal line D−.

At time point 2 the portable electronic device exerts some data activity on the shorted signal lines D− and D+. The portable electronic device continues to charge until it is manually disconnected from the charger at time point 3. D− then returns to a value of about 2.5 volts. The microcontroller 128 detects this change at the input 164. The microcontroller 126 commands the switch 126 to open and disconnect mains power. At the 10 second mark the mains power is disconnected and the microcontroller returns to a timed deep sleep mode.

This same timed wake up technique can be applied to the example in FIG. 4 that has the behavior shown in FIG. 5. After mains power connection, if the voltage measured at D+ is a value equal to that found between time point 3 and time point 5 in FIG. 5, then charging shall continue. If instead the voltage measured at D+ is a value equal to that found between time point 5 and time point 6, then the microprocessor can conclude a portable device is not connected and it can return to a timed deep sleep mode.

Figure 9:
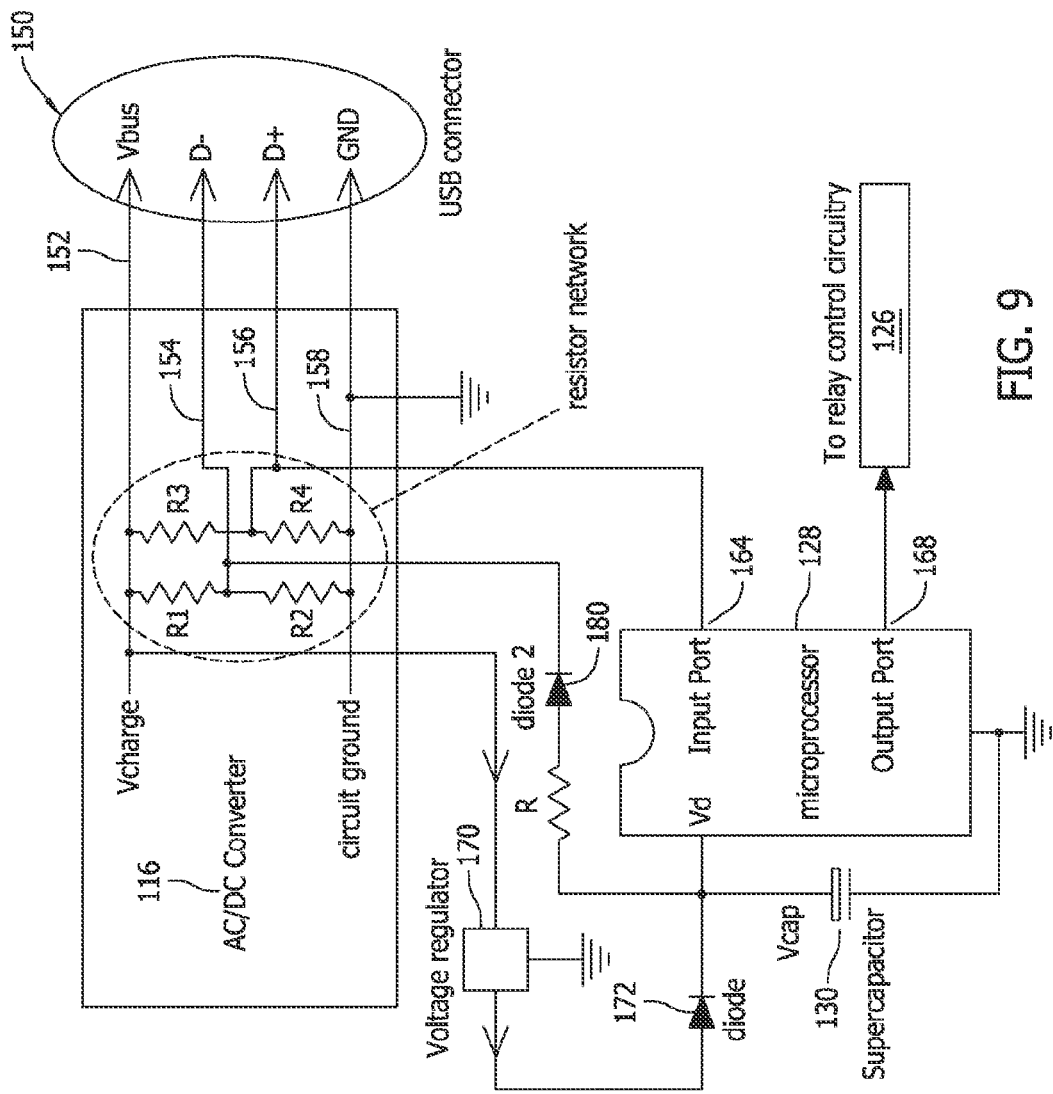
FIG. 9 schematically illustrates an alternative embodiment of an exemplary charger appliance.

The example shown in FIG. 4, which connects a manufacturer's cell phone that uses its own method to determine connection to the resistor network, is modified as shown in the configuration depicted in FIG. 9.

In FIG. 9, only one input port 164 on the microprocessor is used and it is connected to D+, which is the only signal line monitored. Everything else in FIG. 9 is the same as defined for FIG. 4. The behavior in this example is shown in FIG. 10.

Figure 10:
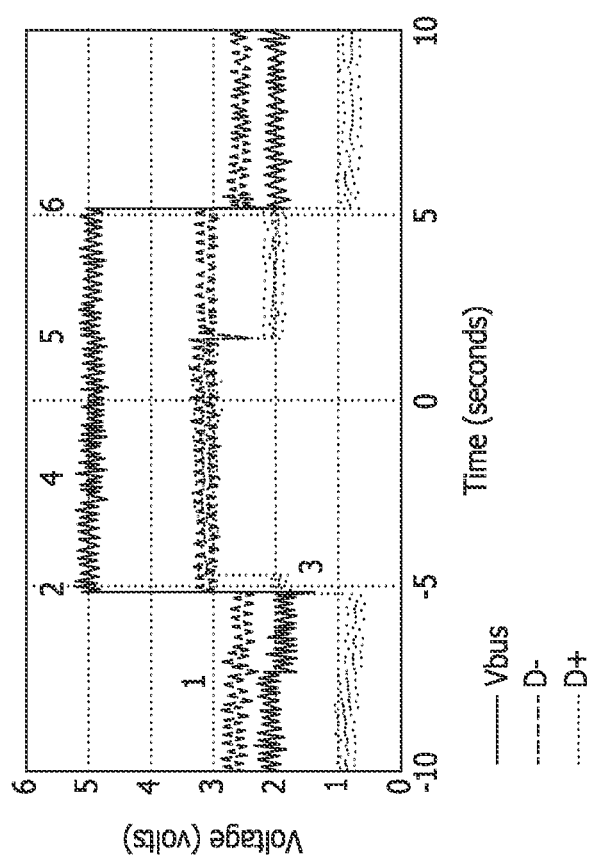
FIG. 10 is a first exemplary voltage versus time plot illustrating charger state detection for the charger appliance shown in FIG. 9.

The bias provided by Vcap produces the voltages shown on Vbus, D−, and D+ as shown in FIG. 10 prior to time point 1. Exactly at time point 1 the portable electronic device 104 is connected to the battery charger.

After wake up from a timed deep sleep mode, the microprocessor 128 connects mains power and Vcharge appears on Vbus at exactly time point 2.

At time point 3 the electronic device 104 responds and the value of the voltage on D+ rises to approximately 3 volts. The microcontroller 128 detects this voltage value and continues to apply mains power. If instead it detected a voltage value of about 2 volts or under, the microcontroller 128 would disconnect mains power and return to a timed deep sleep mode.

At time point 4 the portable electronic device 104 starts the charging process.

At time point 5 the electronic device 104 is manually disconnected from the battery charger. The value of voltage detected at D+ drops to 2 volts. The microprocessor in response to this voltage value disconnects mains power at time point 6 and thereafter returns to a timed deep sleep mode.

Figure 11:
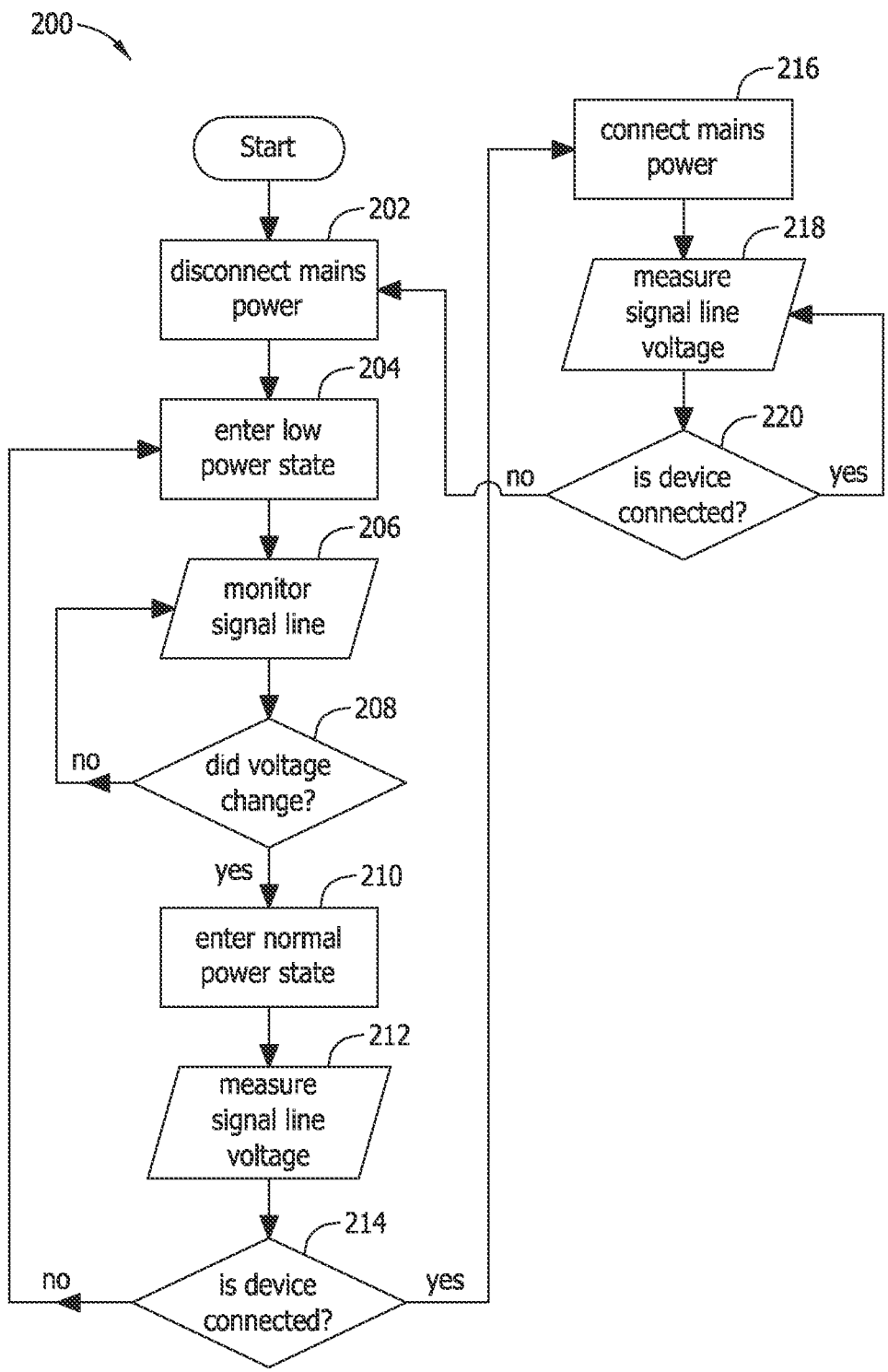
FIG. 11 illustrates a first exemplary state detection algorithm for a charger appliance.

FIG. 11 illustrates an exemplary flow chart of an algorithm 200 for processes performed by and implemented with the processor-based controls described above, including but not necessarily limited to the controller 128 in the exemplary circuits described above. The processor based controls, via the exemplary algorithm may respond to actual connection of the charger to the portable electronic device, and disconnection of the charger from the portable electronic device via detected changes in voltages on one or more signal lines as described above to determine whether the charging cable is connected or disconnected from the electrical device 104.

As shown in FIG. 11, the algorithm 200 begins with the mains power disconnected via the switch in the charger as shown at step 202. The controller enters its low power sleep state at step 204, but in the sleep state is configured to monitor at least one signal line as shown as step 206.

As explained above, a voltage change on the monitored signal line will cause the controller to wake up from the low power sleep state. Accordingly, as shown at step 208, if the voltage on the monitored signal line(s) does not change, the controller remains in the sleep state but continues to monitor the signal line.

When a voltage change is detected at step 208, the controller wakes up and enters its normal operating state at full power. The controller then measures the voltage on the signal line(s) as shown at step 212 and may determine if the measured voltage indicates whether the electronic device is connected or disconnected as shown at step 214. Any of the techniques described above may be used to make this determination of whether the charge is in a connected state with a portable electronic device, or whether the charger is in the no-load state or unconnected to any portable electronic device.

If it is determined at step 214 that the charger is not connected to an electronic device (i.e., the charger is in the no-load state), the controller returns to enter the low power sleep state as shown at step 204.

If it is determined at step 214 that the charger is connected to an electronic device (i.e., the charger is connected to an electronic device for charging), the controller connects the mains power as shown at step 216 so that charging power can be supplied through the charger to the connected electronic device. The controller then, as shown as at step 218 continues to monitor the voltage of the signal line(s) using any of the techniques described above. When the voltage changes again on the monitored line(s), the controller may determine the charger state using the techniques described above.

If at step 220 it is determined that the charger has been disconnected from the electronic device, the controller returns to disconnect the mains power supply as shown at step 202.

If at step 220 it is determined that the charger remains connected to the electronic device, the controller returns to step 218 and continues to monitor the voltage of the signal line(s).

Using the algorithm 200, the controller remains in a low power state until a portable device is connected, and thereafter remains in its normal, full power operating state until the portable electronic device is disconnected. That is, the controller remains electrically active at all times when the mains power supply is connected and draws power from the energy storage device provided in the charger to continuously monitor the signal line(s). The energy storage device is re-charged by the converter circuitry as in the charger as it operates, however, and hence the energy storage device in the charger will be fully charged when the controller later enters its low power sleep state.

Figure 12:
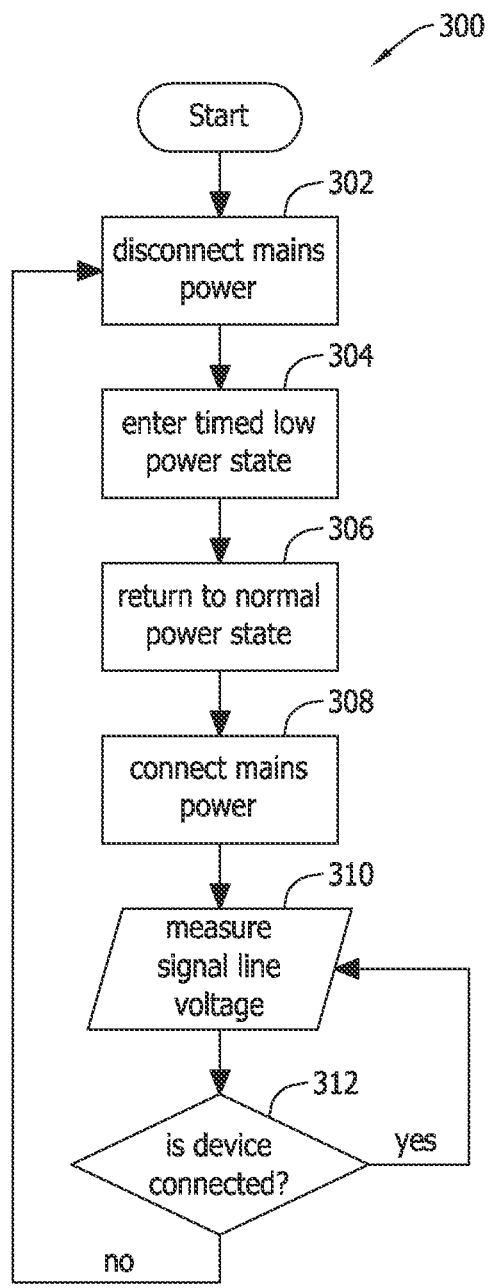
FIG. 12 illustrates a second exemplary state detection algorithm for a charger appliance.

FIG. 12 is an exemplary flow chart of an alternative algorithm 300 for processes performed by and implemented with the processor based controls described above, including but not necessarily limited to the controller 128 in the exemplary circuits described above.

Like the algorithm 200 (FIG. 11) the algorithm 300 shown in FIG. 12 begins with the mains power disconnected via the switch in the charger as shown at step 302. The controller enters its low power sleep state at step 304.

After a predetermined time period expires, the controller wakes up and enters its normal operating state at full power as shown at step 306. The controller then connects the mains power via the switch as shown at step 308 and measures the voltage on the signal line(s) as shown at step 310.

The controller may then determine at step 312 if the measured voltage indicates whether the electronic device is connected or disconnected. Any of the techniques described above may be used to make this determination of whether the charge is in a connected state with a portable electronic device, or whether the charger is in the no-load state or unconnected to any portable electronic device.

If it is determined at step 312 that the charger is not connected to an electronic device (i.e., the charger is in the no-load state), the controller returns to disconnect the mains power supply at step 302 and enter the low power sleep state as shown at step 304.

If it is determined at step 312 that the charger is connected to an electronic device (i.e., the charger is connected to an electronic device for charging), the controller continues to measure the voltage of the signal line(s) at step 310 using any of the techniques described above.

Comparing the algorithms 200 and 300, it is seen that the algorithm 300 does not rely on a monitored voltage to wake the controller. Rather, the controller periodically wakes up to measure the voltage on the monitored signal lines. Also, the algorithm 300 does not utilize voltage of the energy storage device in the charger to monitor the voltage, but rather connects the mains power to make the voltage determinations. As a result, the algorithm 300 is a bit simpler to implement, but would consume more power than the algorithm 200 in actual use.

Having now described the algorithms 200 and 300 it is believed that those in the art may program the controller 128 or otherwise configure it to implement the processes and features shown and described in relation to FIGS. 2-12. It is recognized, however, that not all of the process steps as shown and described in FIGS. 11 and 12 are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may also be implemented in combination with the steps described.

Figure 13:
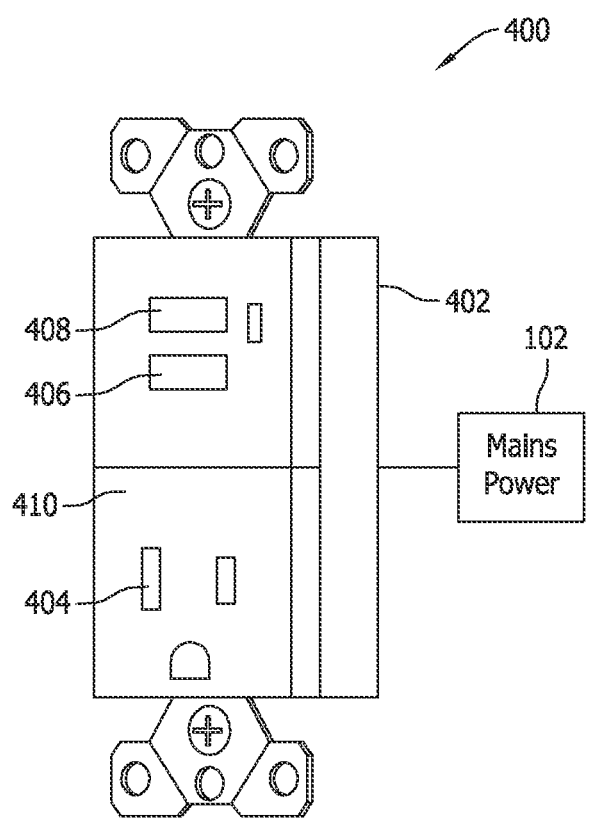
FIG. 13 illustrates an embodiment of a wall outlet including state detection features for an electrical appliance.

FIG. 13 illustrates an exemplary embodiment of an electrical outlet 400 including control circuitry 402 interfacing the mains power supply 102 with receptacle connectors 404, 406 and 408 as shown. While three receptacles are shown in the example of FIG. 13, greater or fewer numbers of receptacles may be provided in other embodiments. The control circuitry 402 may correspond to the control circuitry 108 (FIG. 1) and may operate according to any of the exemplary embodiments disclosed in relation to FIGS. 2-12 above. The control circuitry 402 may be hard wired to the mains power supply 102 in a known manner and may be attached to a face plate 410 including openings for the receptacle connectors 404, 406, 408. A cover plate (now shown) may also be provided to surround the face plate 410. The outlet 400 may be provided as an assembly as shown for installation, or alternatively may be provided as a kit for assembly and installation in the field. The outlet 400 may also be provided as a retrofit replacement outlet to existing outlets that offer no energy management features.

As shown in the example of FIG. 13, the receptacle 404 includes a standard, three prong electrical connector for establishing electrical connection to an AC mains power supply 102 in a conventional manner. The receptacles 406 and 408 may provide, for example DC power connectors for a compatible portable electronic device including any of the devices described above. Thus, more than one device may be connected to the outlet 400 via the receptacles 406 and 408.

Further, the receptacles 406 and 408 may include USB ports or connectors configured for connection to an electronic device via a USB cable, or may be otherwise be configured for connection to a cable of the electronic device via specifications of the device manufacturer. Power conversion from the mains power supply 102 is provided in the controls 402 as described above and converted output power is supplied to the receptacle connectors 406 and 408. As described in detail above, the controls 402 may monitor a signal line, or signal lines, in the charging cable or power cable associated with the electronic device to determine whether the cable is connected or disconnected to and from the electronic device. Accordingly, the controls 402 can monitor voltage on the signal line(s) and disconnect the converter circuitry from the mains power supply when the cable is disconnected from the electronic device and accordingly consume zero power when in a no-load state. This may be accomplished while the cables are plugged into the receptacles 406, 408 and thus a user of the electronic device need not unplug the cables from the wall outlet 400 when not in use.

The cable connections to the receptacles 406, 408 in different embodiments may be individually monitored, or monitored in combination. For example, if a cable attached to the first receptacle 406 is determined to be connected to a first electronic device, the second receptacle 408 can automatically be switched on (and vice versa), regardless of whether a cable is also attached to the second receptacle 408. Alternatively, the receptacles 406 and 408 may be independently operable and are connected to the mains power supply via the controls 402 only when a connected cable is determined to be coupled to the electronic device. In such a scenario, one of the receptacles 406, 408 may be determined to be in a no-load state while the other of the receptacles is coupled to an electronic device in need of power. Accordingly, one of the receptacles 406, 408 may be switch on while the other remains switch off by operation of the controls 402.

The receptacle 404 may also in various embodiments be operated in combination with the receptacles 406, 408 or may be independently operable regarding a state of the receptacles 404, 406. That is, the receptacle 404 may be switched on only when one of the receptacles 406, 408 is coupled to an electronic device, or may alternatively be unswitchable and always on from the perspective of the controls 402. In still another embodiment, the receptacle 404 may be controlled to manage undesirable energy consumption by an associated device, but in a manner other than the controls described for the receptacles 406 and 408.

By building the energy management intelligence into the outlet 400, electronic device users need not be concerned with vampire power issues at all, and difficult consumer education issues and/or consumer cooperation to manage vampire energy issues, is rendered unnecessary. In various embodiments, the electrical outlet may be configured as a wall outlet, a floor outlet, or a furniture outlet. In other words, and for example, the outlet may be mounted on a wall of a residence or commercial building, the outlet may be mounted on a floor of a residence or commercial building, or may be mounted on a piece of furniture such as a desk, a bookcase, or an entertainment center. Different versions of the outlets may be provided for each application (e.g., wall mount, floor mount, or furniture mount) having different numbers and arrangements of receptacles. Of course, more than one type of receptacle may be used in combination to provide still other numbers and variations of potential connections to different electrical devices. In still further embodiments, the outlet may be configured as a vehicle electric power outlet for installation at any convenient location in a vehicle.

In still other embodiments, such intelligent outlets 400 may be integrated with still other types of devices such as lamps to provide convenient connection to electronic devices for external power and charging purposes. Such outlets integrated on other devices such as lamps may be especially desirable in hotel rooms or resort rooms to provide an expanded number of power outlets in an otherwise attractive feature in the room.

Finally, intelligent outlets of the type described may even be provided in or on other electronic devices. For example, a notebook or tablet computer may be provided with an intelligent receptacle 406 or 408 that only supplies output power to the receptacle connector when an associated cable is actually coupled to another electronic device.

The benefits and advantages of the invention are now believed to be apparent from the exemplary embodiments disclosed. It is recognized, however that further adaptations are possible to achieve similar functionality.

An embodiment of an energy management control for an electrical device powered by a mains power supply via a cable including a power line and at least one signal line has been disclosed. The control includes: a processor-based device; converter circuitry configured to supply output power to the power line in the cable when the cable is connected to the electrical device; and a switch operable by the processor-based device to connect or disconnect the mains power supply and the converter circuitry. The processor-based device is configured to monitor a voltage of the at least one signal line to determine whether the cable is connected or disconnected to the electrical device, and to operate the switch to disconnect the mains power supply and the converter circuitry when the cable is determined to be disconnected from the electrical device.

Optionally, the energy management control may further include an energy storage element, and the processor-based device may be further configured to: apply a voltage to the at least one signal line with the energy storage element; and measure a voltage of the at least one signal line. The controller may be configured to determine that the cable is connected to the electrical device when the applied voltage is different than the measured voltage. The energy storage element may be operable to power the processor based device when the converter circuitry is disconnected from the mains power supply. The processor-based device may be configured to monitor the voltage of the at least one signal line while the converter circuitry is disconnected from the mains power supply.

The cable may include the power line, a pair of signal lines, and a ground line. The cable may be configured with a Universal Serial Bus (USB) connector. The pair of signal lines may be shorted together. The processor-based device may be operable in a low power sleep mode while the cable is determined to be disconnected. The processor based may be configured to: monitor a voltage associated with the shorted signal lines while in the low power sleep mode, wake up when any change in voltage of the shorted signal lines is detected, and operate the switch to connect or disconnect the converter circuitry and the mains power supply based on the detected change in voltage. The processor-based device may be configured to operate the switch to disconnect the converter circuitry and the mains power supply based on a detected increase in voltage on the shorted signal lines.

The processor-based device may also be configured to operate the switch to connect the converter circuitry and the mains power supply based on a detected decrease in voltage on the shorted signal lines. The energy management control may further include an energy storage element, and the processor-based device may be configured to: wake up while the while the cable is determined to be disconnected; measure a voltage associated with the energy storage element; and if the measured voltage is below a predetermined threshold, operate the switch to connect the converter circuitry to the mains power supply for a time sufficient to re-charge the energy storage element to a predetermined voltage.

The processor-based device may be configured to monitor a voltage of a first one of the pair of signal lines to determine whether the cable is connected to the electrical device, and the controller may be configured to monitor a voltage of the second one of the pair of signal lines to determine whether the cable is disconnected to the electrical device. A first change in voltage on the first signal line may indicate a connection of the cable to the electrical device, and a second change in voltage on the second signal line may indicate a disconnection of the cable from the electrical device, wherein the first and second changes in voltage are different from one another.

The processor-based device may also be configured to monitor a voltage of only one of the pair of signal lines to determine whether the cable is connected to the electrical device. The processor-based device may be operable in a lower power sleep mode, and may be configured to periodically wake up and check the voltage of the only one signal line to determine whether the cable is connected to the electrical device. The processor-based device may be configured to connect the mains power supply to the converter circuitry prior to checking the voltage on the only one signal line.

The processor-based device may be configured to connect the mains power supply to the converter circuitry prior to monitoring the voltage of the at least one signal line.

The electrical device may be a portable electronic device including a rechargeable onboard power supply, and the control may be configured as a charging appliance for the rechargeable onboard power supply. The portable electronic device may be at least one of a cellular phone, a smart phone, a notebook computer, a laptop computer, a tablet computer, a portable DVD player, an audio and video media entertainment device, an electronic reader device, a gaming devices, a global positioning system (GPS) device, a digital camera device, and a video recorder device.

The converter circuitry may be adapted for one of an AC mains power supply and a DC mains power supply. The energy management control may also include an interface plug, the interface plug configured to connect to the mains power supply. The interface plug may be configured to connect to a DC power supply of a vehicle via a power outlet provided in the vehicle. The vehicle is at least one of a passenger vehicle, a commercial vehicle, a construction vehicle, a military vehicle, an off-road vehicle, a marine vehicle, an aircraft, a space vehicle, and a recreational vehicles.

The energy management control may also be configured as an electrical outlet. The outlet may include at least one connector for the cable. The at least one connector may be a Universal Serial Bus (USB) connector. The outlet may be one of a wall outlet, a floor outlet, or a furniture outlet. The outlet may also include a plurality of connectors for a respective one of a plurality of cables.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An energy management control for an electrical device powered by a mains power supply via a cable including a power line and at least one signal line,
    the energy management control comprising:
        a processor-based device;
        converter circuitry configured to supply output power to the power line in the cable when the cable is connected to the electrical device; and
        a switch operable by the processor-based device to connect an electrical path between the mains power supply and the converter circuitry or disconnect and electrically isolate the mains power supply from the converter circuitry;
        wherein the processor-based device is configured to monitor a voltage of the at least one signal line to determine whether the cable is connected or disconnected to the electrical device, and to operate the switch to disconnect and electrically isolate the mains power supply from the converter circuitry when the cable is determined to be disconnected from the electrical device.

2. The energy management control of claim 1, further comprising an energy storage element, and wherein the processor-based device is further configured to:
    apply a voltage to the at least one signal line with the energy storage element; and
    measure a voltage of the at least one signal line.

3. The energy management control of claim 2, wherein the energy management control is configured to determine that the cable is connected to the electrical device when the applied voltage is different than the measured voltage.

4. The energy management control of claim 2, wherein the energy storage element is operable to power the processor-based device when the switch is operated to disconnect and electrically isolate the mains power supply from the converter circuitry.

5. The energy management control of claim 2, wherein the processor-based device is configured to monitor the voltage of the at least one signal line while the mains power supply is disconnected and electrically isolated from the converter circuitry.

6. The energy management control of claim 1, wherein the cable includes the power line, a pair of signal lines, and a ground line.

7. The energy management control of claim 6, wherein the cable is configured with a Universal Serial Bus (USB) connector.

8. The energy management control of claim 6, wherein the pair of signal lines are shorted together.

9. The energy management control of claim 8, wherein the processor-based device is operable in a low power sleep mode while the cable is determined to be disconnected.

10. The energy management control of claim 9, wherein the processor-based device is configured to:
monitor a voltage associated with the shorted signal lines while in the low power sleep mode,
wake up when any change in voltage of the shorted signal lines is detected, and
based on the detected change in voltage, operate the switch to connect the electrical path between the mains power supply and the converter circuitry or disconnect and electrically isolate the mains power supply and the converter circuitry.

11. The energy management control of claim 10, wherein the processor-based device is configured to operate the switch to disconnect and electrically isolate the mains power supply from the converter circuitry based on a detected increase in voltage on the shorted signal lines.

12. The energy management control of claim 10, wherein the processor-based device is configured to operate the switch to connect the electrical path between the mains power supply and the converter circuitry based on a detected decrease in voltage on the shorted signal lines.

13. The energy management control of claim 9, further comprising an energy storage element, and wherein the processor-based device is configured to:
wake up while the while the cable is determined to be disconnected;
measure a voltage associated with the energy storage element; and
if the measured voltage is below a predetermined threshold, operate the switch to connect the electrical path between the mains power supply and the converter circuitry for a time sufficient to re-charge the energy storage element to a predetermined voltage.

14. The energy management control of claim 6, wherein the processor-based device is configured to monitor a voltage of a first one of the pair of signal lines to determine whether the cable is connected to the electrical device, and wherein the controller is configured to monitor a voltage of the second one of the pair of signal lines to determine whether the cable is disconnected to the electrical device.

15. The energy management control of claim 14, wherein a first change in voltage on the first signal line indicates a connection of the cable to the electrical device, and wherein a second change in voltage on the second signal line indicates a disconnection of the cable from the electrical device, wherein the first and second changes in voltage are different from one another.

16. The energy management control of claim 6, wherein the processor-based device is configured to monitor a voltage of only one of the pair of signal lines to determine whether the cable is connected to the electrical device.

17. The energy management control of claim 16, wherein the processor-based device is operable in a lower power sleep mode, and is configured to periodically wake up and check the voltage of the only one of the pair of signal lines to determine whether the cable is connected to the electrical device.

18. The energy management control of claim 17, wherein the processor-based device is configured to connect the electrical path between the mains power supply to and the converter circuitry prior to checking the voltage on the only one of the pair of signal lines.

19. The energy management control of claim 1, wherein the processor-based device is configured to connect the electrical path between the mains power supply and the converter circuitry prior to monitoring the voltage of the at least one signal line.

20. The energy management control of claim 1, wherein the electrical device is a portable electronic device including a rechargeable onboard power supply, and the energy management control is configured as a charging appliance for the rechargeable onboard power supply.

21. The energy management control of claim 20, wherein the portable electronic device comprises at least one of a cellular phone, a smart phone, a notebook computer, a laptop computer, a tablet computer, a portable DVD player, an audio and video media entertainment device, an electronic reader device, a gaming devices, a global positioning system (GPS) device, a digital camera device, or a video recorder device.

22. The energy management control of claim 1, wherein the converter circuitry is adapted for one of an AC mains power supply and a DC mains power supply.

23. The energy management control of claim 1, further comprising an interface plug, the interface plug configured to connect to the mains power supply.

24. The energy management control of claim 23, wherein the interface plug is configured to connect to a DC power supply of a vehicle via a power outlet provided in the vehicle.

25. The energy management control of claim 24, wherein the vehicle is at least one of a passenger vehicle, a commercial vehicle, a construction vehicle, a military vehicle, an off-road vehicle, a marine vehicle, an aircraft, a space vehicle, or a recreational vehicle.

26. The energy management control of claim 1, wherein the energy management control is configured as an electrical outlet.

27. The energy management control of claim 26, wherein the outlet includes at least one connector for the cable.

28. The energy management control of claim 27, wherein the at least one connector is a Universal Serial Bus (USB) connector.

29. The energy management control of claim 27, wherein the outlet is one of a wall outlet, a floor outlet, or a furniture outlet.

30. The energy management control of claim 26, wherein the outlet includes a plurality of connectors for a respective one of a plurality of cables.

\* \* \* \* \*